United States Patent [19]

Shimozawa et al.

[11] Patent Number: 4,759,966
[45] Date of Patent: * Jul. 26, 1988

[54] COATING TYPE PERPENDICULAR MAGNETIC RECORDING MEDIUM FOR DIGITAL RECORDING

[75] Inventors: Toru Shimozawa; Shigeyo Miyamori; Masaharu Nishimatsu, all of Nagano, Japan

[73] Assignee: TDK Corporation, Tokyo, Japan

[*] Notice: The portion of the term of this patent subsequent to Jan. 19, 2005 has been disclaimed.

[21] Appl. No.: 854,025

[22] Filed: Apr. 21, 1986

[30] Foreign Application Priority Data

| Apr. 22, 1985 | [JP] | Japan | 60-86052 |
| Apr. 30, 1985 | [JP] | Japan | 60-93056 |
| Apr. 30, 1985 | [JP] | Japan | 60-93057 |
| Apr. 30, 1985 | [JP] | Japan | 60-93058 |
| Jun. 20, 1985 | [JP] | Japan | 60-134955 |
| Jun. 22, 1985 | [JP] | Japan | 60-136457 |

[51] Int. Cl.⁴ ............................................. G11B 5/70
[52] U.S. Cl. ................................. 428/141; 427/128; 428/323; 428/329; 428/332; 428/694; 428/900
[58] Field of Search ............ 428/323, 328, 329, 694, 428/900, 332, 141; 427/128

[56] References Cited

U.S. PATENT DOCUMENTS

| 4,486,496 | 12/1984 | Dezawa et al. | 428/694 |
| 4,537,833 | 8/1985 | Kasuga et al. | 428/694 |
| 4,552,808 | 11/1985 | Fujiyama et al. | 428/900 |
| 4,565,726 | 1/1986 | Oguchi et al. | 428/900 |
| 4,591,528 | 5/1986 | Nishimatsu et al. | 428/900 |

FOREIGN PATENT DOCUMENTS

| 0139244 | 2/1985 | European Pat. Off. . |
| 0137949 | 4/1985 | European Pat. Off. . |
| 0136590 | 10/1985 | European Pat. Off. . |

Primary Examiner—Paul J. Thibodeau
Attorney, Agent, or Firm—Oblon, Fisher, Spivak, McClelland & Maier

[57] ABSTRACT

In a coating type perpendicular magnetic recording medium intended for digital recording comprising a substrate and a magnetic layer thereon, the magnetic layer is formed from a composition of a binder, preferably radiation-curable binder and plate magnetic material such as hexagonal plate barium or strontium ferrit having an average particle diameter of up to 0.15 μm and a flakiness of at least 6.

4 Claims, 5 Drawing Sheets

COATING TYPE PERPENDICULAR MAGNETIC RECORDING MEDIUM FOR DIGITAL RECORDING

CROSS REFERENCE TO THE RELATED APPLICATIONS

Reference is made to copending U.S. application Ser. No. 839,570 filed Mar. 14, 1986, for Magnetic Recording Medium; and Ser. No. 849,860 filed Apr. 9, 1986, for Magnetic Recording Medium where both applications are assigned to the same assignee as the present invention.

BACKGROUND OF THE INVENTION

This invention relates to a magnetic recording medium, and more particularly, to a coating type perpendicular magnetic recording medium intended for digital recording.

Several years have passed since flexible disks became widespread as digital recording media. The flexible disks characterized by high recording density, fast data transfer, and random access are particularly useful as files in small-sized systems. The recent appearance of hard disks allows for a further increase in recording density.

In the currently available flexible and hard disks, digital recording is based on the coplanar or longitudinal recording mode. In order to further increase the recording density, it is desired to develop a variety of perpendicular magnetic recording media for digital recording.

SUMMARY OF THE INVENTION

An object of the present invention is to provide a novel and improved coating type perpendicular magnetic recording medium having improved perpendicular rectangular ratio and increased linear recording density satisfactory as high density digital recording medium as well as improved surface roughness and output stability.

According to the present invention, there is provided a coating type perpendicular magnetic recording medium comprising a substrate and a magnetic layer formed thereon. The magnetic layer is formed from a composition comprising a binder and a plate magnetic material having an average particle diameter of up to 0.15 μm and a flakiness of at least 6.

DETAILED DESCRIPTION OF THE INVENTION

Figure 1:
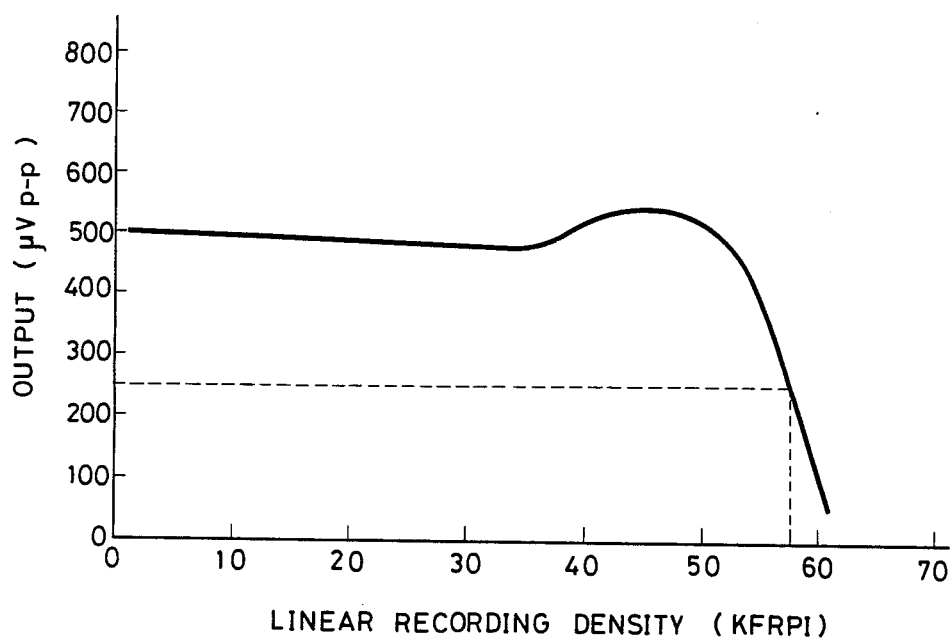
FIG. 1 is a diagram illustrating the output of a sample of the magnetic recording medium of the present invention as a function of the linear recording density.

The coating type perpendicular magnetic recording medium for digital recording according to the present invention (to be referred to as magnetic recording medium for brevity sake) has a magnetic layer which contains a powdery magnetic material and a binder.

The powdery magnetic material used herein is preferably comprised of hexagonal plate-shaped barium and strontium ferrites. Better electromagnetic properties are obtained when the average particle diameter is up to about 0.15 μm, preferably 0.02 to 0.10 μm, and most preferably 0.02 to 0.08 μm. The average thickness of magnetic plates ranges up to about 0.025 μm, preferably from 0.0005 to 0.017 μm, and most preferably from 0.0006 to 0.010 μm.

The average flakiness given as the average particle diameter divided by the average thickness should be at least 6, preferably at least 7, and more preferably at least 8. No particular upper limit is imposed on the flakiness, but usually it is up to 60. The surface roughness, degree of perpendicular orientation, and $D_{50}$ of the magnetic layer are outstandingly improved particularly when the average flakiness ranges from 20 to 60.

Average particle diameters of more than 0.15 μm will reduce the surface roughness and linear recording density. A thickness in excess of 0.025 μm reduces the flakiness to lower than 6, thus resulting in deteriorated perpendicular orientation.

The average particle diameter used herein is determined by taking an electron photomicrograph of particles, for example, of hexagonal barium ferrite under either a scanning electron microscope (SEM) or a transmission electron microscope (TEM), measuring the diameter of fifty (50) particles in cross section, and averaging the measurements. The average thickness is preferably obtained by measuring the half-width at $2\theta$ from an X-ray diffraction pattern. The average flakiness R is then given as the average particle diameter d divided by the average thickness t, that is, $R = d/t$.

The barium ferrites used herein include a hexagonal barium ferrite conforming to $BaFe_{12}O_{19}$ and analogues, and partially substituted barium ferrites of the same formula wherein some Ba and Fe atoms are replaced by other metal atoms such as Ca, Sr, Pb, Co, Ni, Ti, Cr, Zn, In, Mn, Cu, Ge, Nb, Zr, Sn, etc.

Also included are a hexagonal strontium ferrite conforming to $SrFe_{12}O_{19}$ and analogues, and similarly substituted ones. Mixtures of these barium and strontium ferrites may be used.

Barium ferrite and analogues may be prepared by any desired processes, for example, ceramic process, codeposition-sintering process, hydrothermal synthesis process, flux process, glass crystallization process, alkoxide process, and plasma jet process. These processes are described in detail in an article by Y. Koike and O. Kubo, "Ceramics", 18, No. 10 (1983).

The magnetic layer containing the above-specified plate magnetic material preferably has a thickness of up to about 5.0 μm, more preferably up to about 3 μm, and most preferably from about 0.1 to about 1.5 μm although the exact thickness may vary with the shape and size of the plate magnetic material and other factors. With thicknesses of more than about 5 μm, the magnetic plates are oriented to a lower degree of perpendicular orientation and the resulting magnetic layer exhibits a poor surface roughness.

The magnetic layer should preferably have a surface roughness R20 of up to 0.08 μm, and more preferably up to 0.06 μm. The lower limit of surface roughness R20 is generally about 0.01 μm. A magnetic layer having a rough surface with an R20 of more than 0.08 μm comes in poor contact with a head during operation, failing to ensure precise writing/reading with a high recording density.

The term surface roughness R20 used herein is a twenty-point mean surface roughness. The twenty-point mean surface roughness R20 has the same definitions and designation as the ten-point mean surface roughness Rz by JIS B 0601-1982 with the exception of increasing the number of measurement points from ten to twenty. The terms, surface roughness, profile, reference length of profile, roughness curve, cut-off value, mean line of profile, and profile peak and valley are as defined in the standard.

The twenty-point mean roughness shall be the value of difference, being expressed in micrometer (μm), between the mean value of altitudes of peaks from the highest to the 10th, measured in the direction of vertical magnification from a straight line that is parallel to the mean line and that does not intersect the profile, and the mean value of altitudes of valleys from the deepest to the 10th, within a sampled portion, of which length corresponds to the reference length, from the profile. The profile may be depicted by means of a probe meter, for example.

The twenty-point mean roughness R20 is given by the following equation:

$$R20 = [(R_1 + R_2 + R_3 + R_4 + R_5 + R_6 + R_7 + R_8 + R_9 + R_{10}) - (R_{11} + R_{12} + R_{13} + R_{14} + R_{15} + R_{16} + R_{17} + R_{18} + R_{19} + R_{20})]/10$$

wherein $R_1$ to $R_{10}$ are altitudes of peaks from the highest to the 10th for the sampled portion corresponding to the reference length L, and $R_{11}$ to $R_{20}$ are altitudes of valleys from the deepest to the 10th for the samples portion corresponding to the reference length L. The reference length L varies with the range of the twenty-point mean roughness R20 and it is also in conformity to the standard. For example, L=0.25 mm when $R20 \leq 0.8$ μm.

The probe-type surface roughness meter used herein is Talystep-1 manufactured by Taylor Hobson Company. The probe having a tip size of 0.1 x 2.5 μm was operated under a load of 2 mg with a cut-off value of the order of 0.18 to 9 Hz (166.7 μm to 3.3 μm) at a probe speed of 30 μm/sec.

Binder

The plate magnetic material is prepared into a magnetic paint composition with the aid of a binder which may be selected from radiation curable resins, thermoplastic resins, thermosetting resins, and reactive resins, and mixtures thereof. The thermosetting resins and radiation curable resins are preferred because of the strength of the resultant coatings.

The thermoplastic resins used herein are resins having a softening point of lower than 150° C., an average molecular weight of 10,000 to 200,000, and a degree of polymerization of about 200 to 2,000.

The thermosetting and reactive resins used herein have a similar degree of polymerization. Upon heating after coating and drying, they are converted through condensation, addition or other reactions into polymers having an infinite molecular weight. Preferred among them are those which do not soften or melt until they are thermally decomposed.

Some illustrative non-limiting examples of the resins include resins of condensation polymerization type such as phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; mixtures of any one of the foregoing condensation polymerization resins and a crosslinking agent such as isocyanates; mixtures of a crosslinking agent and a vinyl copolymeric resin such as a vinyl chloride-vinyl acetate copolymer (which may have carboxylic units incorporated therein), a vinyl chloridevinyl alcohol-vinyl acetate copolymer (which may have carboxylic units incorporated therein), a vinyl chloridevinylidene chloride copolymer, a vinyl chloride-acrylonitrile copolymer, a vinyl butyral copolymer, a vinyl formal copolymer, etc.; mixtures of a crosslinking agent and a cellulosic resin such as nitrocellulose, cellulose acetobutyrate, etc.; mixtures of a crosslinking agent and a synthetic rubber such as butadiene-acrylonitrile, etc.; and mixtures of any of the foregoing members.

Particularly preferred are mixtures of an epoxy resin, a butyral resin, and a phenol resin; mixtures of an epoxy resin, polyvinyl methyl ether, and methylol phenol ether as disclosed in U.S. Pat. No. 3,058,844; and mixtures of a bisphenol-A epoxy resin and an acrylate or methacrylate polymer as disclosed in Japanese Patent Application Kokai No. 49-131101.

These thermosetting resins may generally be cured by heating in an oven at about 50° to 80° C. for about 6 to 100 hours.

Among the preferred binders are radiation-curable resins, that is, resins obtained by partially curing a radiation-curable compound.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having unsaturated double bonds capable of crosslinking or polymerizing upon exposure to radiation may also be used.

Typical of the resins in the form of thermoplastic resins having contained in their molecule groups capable of crosslinking or polymerizing upon exposure to radiation are unsaturated polyester resins. Included are polyester resins having radiation-sensitive unsaturated double bonds in their molecular chain, for example, unsaturated polyester resins which may be prepared by a standard process of esterifying polybasic acids of (2) as will be described below and polyhydric alcohols into saturated polyester resins except that the polybasic acids are partially replaced by maleic acid so that the resulting polyesters may have radiation-sensitive unsaturated double bonds.

The radiation-curable unsaturated polyester resins may be prepared by adding maleic acid or fumaric acid to at least one polybasic acid and at least one polyhydric alcohol, conducting dewatering or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curing properties during preparation.

Examples of the thermoplastic resins which can be modified into radiation-curable resins will be described below.

(1) Vinyl Chloride Copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-vinyl alcohol-maleic acid copolymers, vinyl chloride-vinyl acetate-OH terminated, alkyl branched copolymers, for example, VROH, VYNC, VYEGX, VERR, VYES, VMCA, VAGH, UCARMMAG 520, and UCARMAG 528 (all trade names, manufactured by U. C. C.), and analogues. These copolymers may be modified to be radiation sensitive by incorporating acrylic, maleic, or allyl double bonds. They may additionally contain carboxylic units.

(2) Saturated Polyesater Resins

Included are saturated polyesters obtained by esterifying saturated polybasic acids such as phthalic acid, isophthalic acid, terephthalic acid, succinic acid, aidpic acid, sebasic acid, etc. with polyhydric alcohols such as ethylene glycol, diethylene glycol, glycerine, trimethylolpropane, 1,2-propylene glycol, 1,3-butanediol, dipropylene glycol, 1,4-butanediol, 1,6-hexanediol, pentaerithritol, sorbitol, neopentyl glycol, 1,4-cyclohexanedimethanol, etc., and products obtained by modifying these resins with $SO_3Na$ or the like, for example, Vyron 53S (trade name, Toyobo K. K.). They may be modified to be radiation sensitive.

(3) Polyvinyl Alcohol Resins

Included are polyvinyl alcohol, butyral resins, acetal resins, formal resins, and copolymers of such units. They may be modified to be radiation sensitive by acting on a hydroxyl group in them.

(4) Epoxy Resins and Phenoxy Resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K. K.); phenoxy resins which are epoxy resins having a high degree of polymerization, for example, PKHA, PKHC, and PKHH (trade names, manufactured by U. C. C.); and copolymers of brominated bisphenol-A with epichlorohydrin, for example, Epichlon 145, 152, 153, and 1120 (trade names, manufactured by Dai-Nihon Ink K. K.). Also included are carboxyl radical-containing derivatives of the foregoing resins. These resins may be modified to be radiation sensitive by using an epoxy group contained therein.

(5) Cellulosic Derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, hydroxyl-containing acrylic esters, and acrylic resins containing at least one methacrylate as a polymer component.

Examples of the elastomers and prepolymers are presented below.

(1) Polyurethane Elastomers and Prepolymers

Polyurethanes are very useful because of abrasion resistance and adhesion to substrates, for example, PET films. Illustrative polyurethane elastomers and prepolymers are condensation polymerization products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m-phenylenediisocyanate, p-phenylenediisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A. G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Also included are those having an OH or COOH terminal group as a polar group.

Also included are monomers having active hydrogen capable of reacting with an isocyanate group and an unsaturated double bond capable of radiation curing, for example, mono- and diglycerides of long chain fatty acids having an unsaturated double bond.

(2) Acrylonitrile-butadiene Copolymerized Elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K. K. are adequate because the double bond of a butadiene unit is capable of generating a radical upon exposure to radiation to facilitate crosslinking and polymerization.

(3) Polybutadiene Elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as a binder component.

Also, cyclic products of polybutadienes commercially available as CBR-M901 from Nihon Synthetic Rubber K. K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K. K.) while elastomers, for example, epoxy-modified rubbers and internally plasticized, saturated linear polyesters (commercially available as Vyron #300 from Toyobo K. K.) may also be useful provided that they are subjected to radiation sensitive modification.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, 1,6-hexaneglycol dimethacrylate, N-vinylpyrrolidone, pentaerythritol tetraacrylate (and methacrylate), pentaerythritol triacrylate (and methacrylate), trimethylolpropane triacrylate, trimethylolpropane trimethacrylate, polyfunctional oligoester acrylates (e.g., Aronix M-7100, M-5400, 5500, 5700, etc., available from Toa Synthetic K. K.), acryl modified products of urethane elastomers (e.g., Nippolane 4040 available from Nippon Polyurethane K. K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

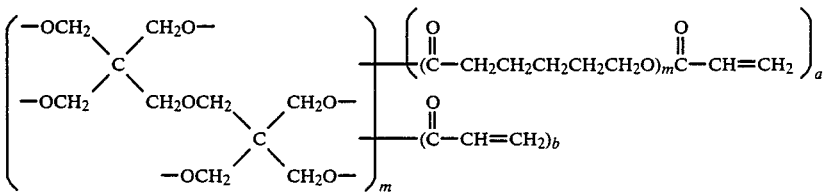

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

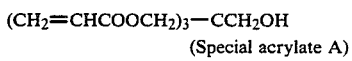

(Special acrylate A)

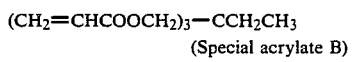

(Special acrylate B)

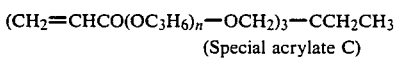

(Special acrylate C)

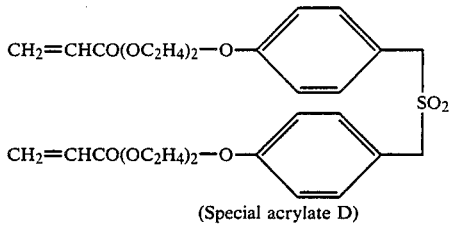

(Special acrylate D)

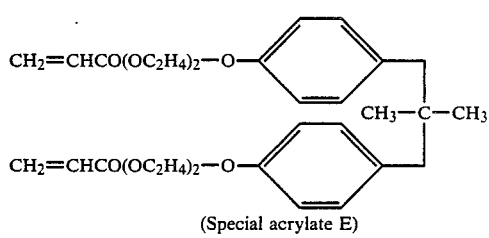

(Special acrylate E)

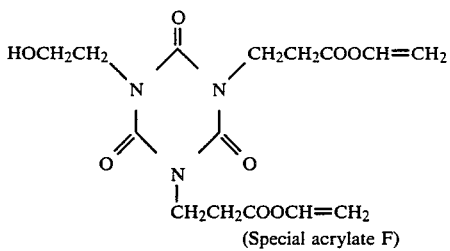

(Special acrylate F)

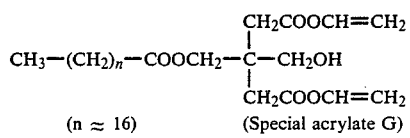

(n ≈ 16) (Special acrylate G)

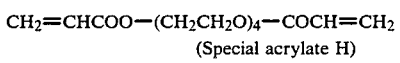

(Special acrylate H)

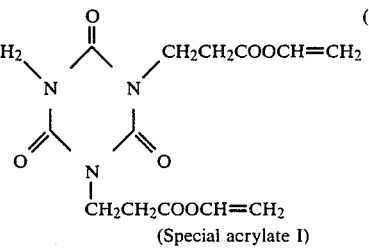

(Special acrylate I)

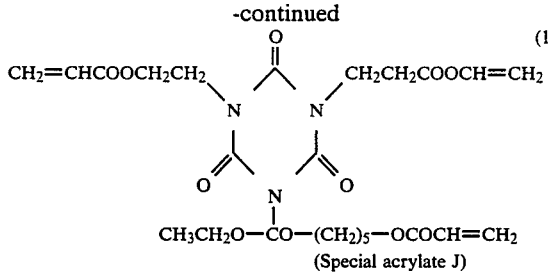

(Special acrylate J)

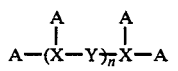

A: acrylic acid  X: polyhydric alcohol
Y: polybasic acid  (Special acrylate K)

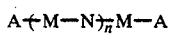

A: acrylic acid  M: dihydric alcohol  N: dibasic acid
(Special acrylate L)

Next, processes for the synthesis of the radiation curable binders will be described.

a. Synthesis of acryl-modified products (radiation sensitive modified resins) of vinyl chloride-vinyl acetate copolymeric resins.

A 5-liter four-necked flask is charged with 750 parts of a partially saponified vinyl chloride-vinyl acetate copolymer having an OH group (average polymerization degree n=500), 1250 parts of toluene, and 500 parts of cyclohexanone. After the flask is heated at 80° C. to dissolve the contents into a solution, 61.4 parts of 2-hydroxyethyl methacrylate adduct of tolylenediisocyanate (the preparation thereof will be described later) is added and then, 0.012 parts of tin octylate and 0.012 parts of hydroquinone are added. Reaction is continued in a nitrogen stream at 80° C. until the reaction rate of NCO reaches 90%. At the end of reaction, the reaction solution is cooled and 1250 parts of methyl ethyl ketone is added for dilution.

Preparation of 2-hydroxyethyl methacrylate (2HEMA) adduct of tolylenediisocyanate (TDI)

In a 1-liter four-necked flask, 348 parts of TDI is heated at 80° C. in a nitrogen stream. A mixture of 260 parts of 2-ethylene methacrylate, 0.07 parts of tin octylate, and 0.05 parts of hydroquinone is then added dropwise while the reactor is cooled so as to control the temperature to 80° to 85° C. After the dropwide addition, the reaction is continued to completion at 80° C. for 3 hours with stirring. At the end of reaction, the contents are taken out of the flask and cooled, obtaining a white paste-like product which is 2HEMA adduct of TDI based on the preparation method.

b. Synthesis of acryl-modified products (radiation sensitive modified resins) of butyral resins A 5-liter four-necked flask is charged with 100 parts of a butyral resin (BM-S, manufactured by Sekisui Chemicals K. K.), 191.2 parts of toluene, and 71.4 parts of cyclohexanone. After the flask is heated at 80° C. to dissolve the contents into a solution, 7.4 parts of 2HEMA adduct of TDI (synthesized as above) is added and then, 0.015 parts of tin octylate and 0.015 parts of hydroquinone are added. Reaction is contunued in a nitrogen stream at 80° C. until the reaction rate of NCO reaches or exceeds 90%. At the end of reaction, the reaction solution is cooled and an amount of methyl ethyl ketone is added for dilution.

c. Synthesis of acryl-modified products (radiation sensitive modified resins) of saturated polyester resins A flask is charged with 100 parts of a saturated polyester resin (Vyron RV-200, manufactured by Toyobo K. K.), 116 parts of toluene, and 116 parts of methyl ethyl ketone. After the flask is heated at 80° C. to dissolve the contents into a solution, 3.55 parts of 2HEMA adduct of TDI (synthesized as above) is added and then, 0.007 parts of tin octylate and 0.007 parts of hydroquinone are added. Reaction is continued in a nitrogen stream at 80° C. until the reaction rate of NCO reaches or exceeds 90%.

d-1. Synthesis of acryl-modified products (radiation sensitive modified resins) of epoxy resins After 400 parts of an epoxy resin (Epicoat 1007, manufactured by Shell Chemicals) is dissolved in 50 parts of toluene and 50 parts of methyl ethyl ketone by heating, 0.006 parts of N,N-dimethylbenzylamine and 0.003 parts of hydroquinone are added. The temperature is raised to 80° C. and 69 parts of acrylic acid is added dropwise. Reaction is continued at 80° C. until the acid value is lowered to below 5.

d-2. Synthesis of acryl-modified products (radiation sensitive modified resins) of phenoxy resins A 3-liter four-necked flask is charged with 600 parts of an OH group-bearing phenoxy resin (PKHH manufactured by U. C. C., molecular weight 30,000) and 1,800 parts of methyl ethyl ketone. After the flask is heated at 80° C. to dissolve the contents into a solution, 6.0 parts of 2HEMA adduct of TDI (synthesized as above) is added and then, 0.012 parts of tin octylate and 0.012 parts of hydroquinone are added. Reaction is continued in a nitrogen stream at 80° C. until the reaction rate of NCO reaches or exceeds 90%. The resultant modified phenoxy product has a molecular weight of 35,000 and one double bond per molecule.

e. Synthesis of acryl-modified products (radiation sensitive modified resins) of urethane elastomers A reactor is charged with 250 parts of a urethane prepolymer of isocyanate-terminated diphenylmethane diisocyanate (MDI) type (Nippolane 3119 manufactured by Nippon Polyurethane K. K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

f. Synthesis of acryl-modified products (radiation sensitive modified elastomers) of terminally urethane-modified polyether elastomers A reactor is charged with 250 parts of a polyether (PTG-500 manufactured by Nippon Polyurethane K. K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

g. Synthesis of acryl-modified products (radiation sensitive modified elastomers) of polybutadiene elastomers A reactor is charged with 250 parts of a low-molecular weight, hydroxyl-terminated polybutadiene (Poly BD Liquid Resin R-15, manuactured by Sinclair Petro-Chemical), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

Among known polymers, polymers of one type degrade while polymers of another type give rise to crosslinking between molecules upon exposure to radiation.

Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable binder as well as the above-mentioned modified products.

These radiation-curable resins may be cured by any of various well-known methods.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 to 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

The radiation curing process allows solventless resin compositions to cure within a short time and thus, such solvent-free resin compositions may be conveniently used in the practice of the present invention.

The use of radiation-curable resins prevents a roll of tape having a large diameter known as a jumbo roll from being tightened. Then no substantial difference in electromagnetic properties is induced between the outside and inside coils of the jumbo roll, resulting in improved properties. Besides, productivity is improved since curing can be carried out as an on-line operation in magnetic tape production.

Preferably, the weight ratio of powder magnetic material to binder ranges from 1/1 to 9/1, and more preferably from 2/1 to 8/1. Weight ratios of lower than 1/1 result in a low saturation magnetic flux density. At ratios of higher than 9/1, the powder magnetic material cannot be well dispersed in the binder so that the resulting coating is rough at the surface and brittle.

A non-reactive solvent may optionally be used in the practice of the present invention. No particular limit is imposed on the non-reactive solvent and a suitable solvent may be chosen by taking into account the solubility of and compatibility with the binder. Some illustrative non-limiting examples of the non-reactive solvents include ketones such as acetone, methyl ethyl ketone, methyl isobutyl ketone, cyclohexanone, etc.; esters such as ethyl formate, ethyl acetate, butyl acetate, etc.; alcohols such as methanol, ethanol, isopropanol, butanol, etc.; aromatic hydrocarbons such as toluene, xylene, ethylbenzene, etc.; ethers such as isopropyl ether, ethyl ether, dioxane, etc.; and furans such as tetrahydrofuran, furfural, etc., alone or in admixture. The solvents may be used in amounts of 10 to 10,000% by weight, preferably 100 to 5,000% by weight based on the binder.

The magnetic layer may further contain an inorganic pigment. Some illustrative non-limiting examples of the inorganic pigments includes electroconductive pigments such as carbon black, graphite, and graphitized carbon black; and inorganic fillers such as $SiO_2$, $TiO_2$, $Al_2O_3$, $Cr_2O_3$, SiC, CaO, $CaCO_3$, zinc oxide, goethite, $\gamma$-$Fe_2O_3$, talc, kaolin, $CaSO_4$, boron nitride, graphite fluoride, molybdenum disulfide, and ZnS. Also employable are finely divided pigments such as aerosil and colloidal pigments including $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$, $SnO_2$, etc. Typical forms of these finely divided pigments are, in the case of $SiO_2$, for example, (1) colloidal solutions of ultrafine silicic acid anhydride (e.g., Snowtex, aqueous methanol silica sol manufactured by Nissan Chemicals K. K.) and (2) ultrafine anhydrous silicas prepared by pyrolysis of pure silicon tetrachloride (standard product 100 A; Aerosil manufactured by Nihon Aerosil K. K.). Aluminum oxide, titanium oxide, and the aforementioned finely divided pigments may also be in the form of either (1) colloidal solution of ultrafine particles or (2) ultrafine particulates prepared by a gas phase process as mentioned above for silicon dioxide.

These inorganic pigments may be used in amounts of about 1 to 30 parts by weight for form (1) and 1 to 30 parts by weight for form (2) per 100 parts by weight of the binder. The use of the inorganic pigments in excess amounts results in a brittle coating which produces more dropouts.

The inorganic pigments may preferably have a diameter of up to 0.1 μm, more preferably up to 0.05 μm for form (1) and up to 0.7 μm, more preferably up to 0.5 μm for form (2).

The magnetic layer may further contain a dispersant. Some illustrative non-limiting examples of the dispersants include organic titanium coupling agents, silane coupling agents, and surface active agents, for example, natural surface active agents also serving as an antistatic agent, such as saponin; nonionic surface active agents such as alkylene oxide, glycerine, and glycidol surface active agents; cationic surface active agents such as higher alkyl amines, quaternary ammonium salts, heterocyclic compounds (e.g. pyridine), phosphoniums and sulfoniums; anionic surface active agents containing an acidic radical such as carboxylic acid, sulfonic acid, phosphoric acid, sulfate ester radicals, and phosphate ester radicals, and amphoteric surface active agents such as amino acids, aminosulfonic acids, sulfates and phosphates of amino alcohols.

The magnetic layer may further contain a lubricant. The lubricants used herein include well-known lubricants commonly used in magnetic recording media of the type, for example, silicone oils, fluoride oils, fatty acids, fatty acid esters, paraffins, liquid paraffins, and various surface active agents, with the fatty acids and/or fatty acid esters being preferred. Some illustrative non-limiting examples of the fatty acids include fatty acids containing at least 8 carbon atoms represented by RCOOH wherein R is an alkyl group having at least 7 carbon atoms, for example, caprylic acid, capric acid, lauric acid, myristic acid, palmitic acid, stearic acid, behenic acid, oleic acid, elaidic acid, linolic acid, linoleic acid, and stearolic acid; and examples of the fatty acid esters include fatty acid esters of a monobasic fatty acid having 12 to 16 carbon atoms with a monohydric alcohol having 3 to 12 carbon atoms and fatty acid esters of a monobasic fatty acid having at least 17 carbon atoms with a monohydric alcohol providing a total of 21 to 23 carbon atoms together with the fatty acid. Also employable are metal soaps in the form of alkali and alkaline earth metal salts of the aforementioned fatty acids and lecithin.

Silicones used may be those modified with a fatty acid and those partially modified with fluoride. Alcohols used may be higher alcohols. Fluorides used may be those prepared by electrolytic substitution, teromerization and oligomerization processes.

Among other lubricants, radiation-curable lubricants may conveniently be used. The use of such curable lubricants prevents the transfer of the morphology of the front surface to the rear surface adjoined in roll form, affording some advantages of reduced dropouts, minimized difference in output between the outside and inside coils of a roll of tape, and on-line production.

Examples of the radiation-curable lubricants include compounds containing a molecular chain capable of lubrication and an acrylic double bond in their molecule, for example, acrylates, methacrylates, vinyl acetate, acrylic acid amides, vinyl alcohol esters, methyl vinyl alcohol esters, allyl alcohol esters, glycerides, and the like. These lubricants may be represented by the following structural formulae:

$$CH_2=CHCOOR, \quad CH_2=\overset{CH_3}{\underset{|}{C}}-COOR,$$

$$CH_2=CH-CH_2COOR, \quad CH_2=CHCONHCH_2COOR,$$

$$\begin{array}{l} CH_2OCOCH=CH_2 \\ | \\ CHCOOR \\ | \\ CH_2COOR, \end{array} \quad \overset{CH_3}{\underset{|}{RCOOC}}=CH_2,$$

$$RCOOCH=CH_2, \quad RCOOCH_2-CH=CH_2, \text{ etc.}$$

wherein R is a straight or branched, saturated or unsaturated hydrocarbon radical having at least 7 carbon atoms, preferably from 12 to 23 carbon atoms.

They may be fluoride substituted lubricants, which may be represented by the following structural formulae:

$$C_nF_{2n+1}-,$$
$$C_nF_{2n+1}(CH_2)_m- \text{ where } m = 1-5,$$

$$C_nF_{2n+1}-SO_2\overset{R}{\underset{|}{N}}CH_2CH_2-,$$

$$C_nF_{2n+1}-CH_2CH_2NHCH_2CH_2-,$$

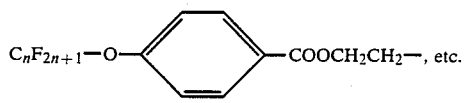

Some preferred examples of these radiation-curable lubricants include stearic acid methacrylate (acrylate), methacrylate (acrylate) of stearyl alcohol, methacrylate (acrylate) of glycerine, methacrylate (acrylate) of glycol, and methacrylate (acrylate) of silicone.

The dispersant and the lubricant each may be used in amounts of about 0.1 to 20 parts by weight per 100 parts by weight of the binder.

The substrates used herein may include films and plates of plastic materials, for example, polyesters such as polyethylene terephthalate, polyolefines such as polypropylene, cellulose derivatives such as cellulose triacetate, polyimides, polycarbonates, polysulfones, polyethylene naphthalate, aromatic aramides, aromatic polyesters; and plates of inorganic materials, for example, metal plates such as aluminum plates and glass plates, but not limited thereto. Preferred among these are polyesters, polyamides, and polyimides.

Generally, the magnetic recording medium of the present invention may have two magnetic layers on the opposite major surfaces of a substrate. Typical examples of the double magnetic layer-bearing medium are floppy disks and hard disks.

If desired, the magnetic recording medium of the present invention may be provided with an undercoat, a backcoat, and/or a topcoat each formed from a commonly used composition in an ordinary fashion. The backcoat, if formed, may preferably have a composition comprised of a binder, a pigment, and a lubricant.

In the magnetic recording medium of the present invention, a high magnetic permeability metal thin film, for example, of Permalloy, and/or an undercoat of any resinous composition may be interposed between the substrate and the magnetic layer.

The undercoat layer may have a composition comprising a thermosetting resin or a radiation-curable compound and any desired additives such as conductive pigments, inorganic fillers, lubricants, and dispersants or surface active agents.

The preferred conductive pigment is carbon black. As exemplary of the carbon black there may be given furnace black, channel black, acetylene black, thermal black, and lamp black, and other carbon blacks prepared by any known processes, with the acetylene black, furnace black, channel black, roller and disk black, and German naphthalin blacks being most preferred.

The carbon blacks may have a particle diameter which is not particularly limited, but preferably ranges from 10 to 100 m$\mu$m, more preferably from 10 to 80 m$\mu$m as measured by electron microscopic analysis. Carbon black having a particle diameter of more than 100 m$\mu$m provides an undercoat with a rough surface contributing to a reduction in the electromagnetic properties of the magnetic layer subsequently applied thereon. Finer carbon black particles of less than 10 m$\mu$m in diameter are difficult to uniformly disperse, also resulting in an undercoat having a rough surface.

The carbon black may preferably be used in amounts of about 5 to 200 parts by weight, more preferably about 20 to 200 parts by weight per 100 parts by weight of the binder. It may also be contained in the backcoat layer.

A special type of carbon black is graphitized carbon black which may also be used in the practice of the present invention.

The provision of such an undercoat layer prevents adherence of the medium to a head to be contacted during recording and reproducing operations, adherence of the medium to a guide roller or calender roll to be contacted during manufacturing processes, typically a coating process, and occurrence of discharge noise.

The undercoat layer preferably has a thickness of about 10 Å to about 5 μm.

When a magnetic layer is formed on each major surface of a substrate, the undercoat layer may also be formed on each of the major surfaces.

Preparation

The magnetic recording medium of the present invention may be prepared by applying a magnetic paint composition of magnetic particles dispersed in a binder on at least one major surface of a substrate, passing the coated substrate through a magnetic field as will be described below, thereby orienting the axis of easy magnetization of the magnetic particles in the coating substantially perpendicular to the coating surface, and then drying the coating.

There are available a number of orienting methods using a permanent magnet, a D.C. magnetic field, and an A.C. magnetic field, and combinations thereof, for example, a combination of vertical and horizontal magnetic fields, a combination of a permanent magnet or D.C. magnetic field with an A.C. magnetic field. Also employable are mechanical orientation and combinations of mechanical orientation with any of the foregoing methods.

The magnetic field under which plate magnetic material in a magnetic layer as coated is oriented is preferably selected from those magnetic fields produced by the following arrangements A to C.

Arrangement A

A pair of main magnets are placed with their N and S poles opposed and a row of auxiliary magnet pieces having the same polarity is placed at the outlet and/or inlet of at least one main magnet.

Arrangement B

A pair of main magnets are placed with their N and S poles opposed and a series of ferromagnetic pieces serving as a minute yoke are placed at a suitable spacing on the opposed surface of at least one main magnet.

Arrangement C

A pair of main magnets are placed with their N and S poles opposed and a yoke is placed at the outlet and/or inlet of at least one main magnet.

The pair of main magnets placed with their N and S poles opposed is referred to as N-S opposed main magnets for brevity.

Arrangements A to C will be described in further detail. The preferred arrangement A is an arrangement wherein the auxiliary magnet piece row is placed at the inlet of the main magnet from the standpoint of improving degree of orientation and surface roughness. At least one set of N-S opposed main magnets and accompanying auxiliary magnet row(s) may be provided.

Figure 2:
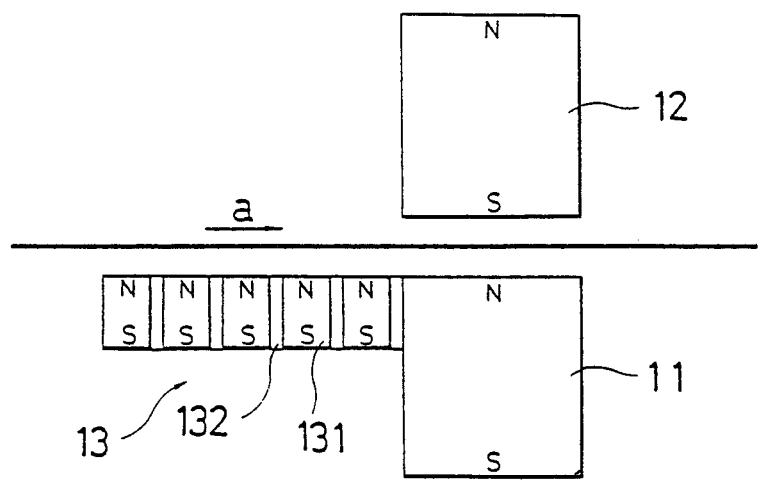
FIGS. 2 to 7 are schematic views illustrating different arrangements for producing a magnetic field for orienting magnetic particles during the manufacture of the magnetic recording medium of the present invention.

FIG. 2 shows one embodiment of arrangement A wherein a row of auxiliary magnet pieces is placed at the inlet of N-S opposed main magnets. More illustratively, a pair of main magnets 11, 12 are placed with their N and S poles opposed. The N pole of one main magnet 11 is opposed to the S pole of the other main magnet 12 to define therebetween a path through which an as-coated film depicted by a solid straight line is passed for magnetic orientation in a direction shown by an arrow a. An auxiliary magnet row 13 of the same polarity is placed at the inlet side of one main magnet 11 with respect to the film transfer direction a. The row 13 includes a plurality of magnet pieces 131 spaced a gap 132. The N poles of the auxiliary magnet pieces 131 face the film transfer path as does the N pole of the main magnet 11. The row includes five magnet pieces 131 in the illustrated embodiment and it may prefetably include 2 to about 50 magnet pieces. One magnet piece may be about 0.5 to about 10 mm long. The gap 132 may have a distance of about 0.5 to about 10 mm, preferably about 1 to about 5 mm.

The gap 132 may be vacant or filled with a spacer of non-magnetic material. A row of magnet pieces may preferably be integrated into an assembly with the aid of such nonmagnetic spacers, but not limited thereto. Some other illustrative arrangements of the auxiliary magnet rows include (1) a plurality of magnetized spaced-apart poles formed by locally intensely magnetizing a magnet material, (2) a plurality of auxiliary magnet pieces embedded in a non-magnetic material, (3) a magnetic material having a plurality of recesses with a plurality of spaced-apart surface regions being intensely magnetized, and (4) a series of auxiliary magnets spaced apart by vacant gaps.

Although permanent magnets are used in these arrangements, electromagnets and solenoids may be equally employed in the same or different arrangements.

The main magnets are not limited to one pair. Plural pairs of main magnets may be used and among them, at least one of main magnets should be followed or preceded by an auxiliary magnet row. Such plural pairs of main magnets may be disposed in various ways. For example, they may be juxtaposed without leaving a space therebetween.

Preferably, each main magnet used produces a central magnetic field having an intensity of about 1000 to 6000 G and each auxiliary main magnet piece used produces a central magnetic field having an intensity of about 100 to 5000 G.

The main magnets may be permanent magnets, electromagnets, or solenoids. The distance between the opposed poles may range from about 5 to about 30 mm and each main magnet may have a pole-to-pole distance of about 100 to about 5000 mm.

The aforementioned arrangements produce a vibrating magnetic field, by virtue of which degree of perpendicular orientation and surface roughness are improved. The abovementioned parameters of main magnets and auxiliary magnet pieces including pole distance, spacing, and magnetic field intensity define the range in which the vibrating magnetic field performs well.

When a plurality of N-S opposed main magnets having a row of auxiliary magnet pieces as mentioned above are used, no particular limitation is imposed on the location of such plural magnets. For instance, the auxiliary magnet rows may be located on the side of the coated surface or back surface of a film or they may be alternately or cyclically located on the coated and back surface sides.

Figure 3:
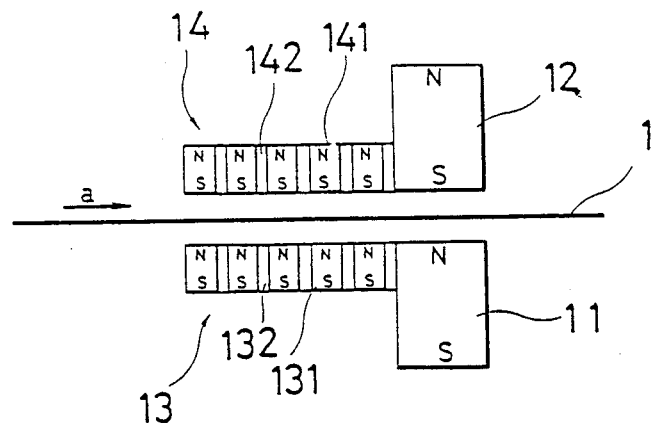

FIG. 3 illustrates another embodiment wherein a pair of auxiliary magnet rows 13, 14 are placed on the inlet side of a pair of main magnets 11, 12. The parameters associated with the main magnets and auxiliary magnet pieces may conform to those described in connection with FIG. 2. Preferably, each main magnet used produces a central magnetic field having an intensity of about 1000 to 6000 G, more preferably about 2000 to 6000 G and each auxiliary main magnet piece used produces a central magnetic field having an intensity of about 100 to 5000 G, more preferably about 500 to 3000 G, that is, about 10 to 70%, more preferably about 20 to 50% of the magnetic field intensity of the main magnet.

Figure 4:
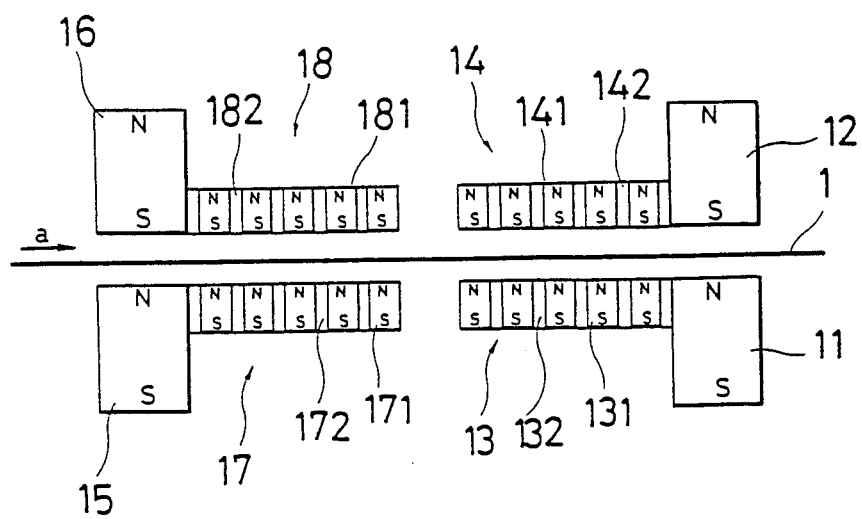

FIG. 4 illustrates another embodiment wherein two pairs of N-S opposed main magnets are each provided with a row of auxiliary magnet pieces. A magnetic recording medium in the form of a film 1 is transferred in the direction of arrow a and thus first passed between a first stage of N-S opposed main magnets 15, 16 which are followed on their outlet side by rows of auxiliary magnet pieces 17, 18 of the same polarity. The film 1 is then passed between a second stage of N-S opposed main magnets 11, 12 which are preceded on their inlet side by rows of auxiliary magnet pieces 13, 14 of the same polarity.

This embodiment produces the same effect as described above. The use of multiple stages of main magnets with auxiliary magnet rows further improves surface precision and degree of orientation.

The parameters associated with the main magnets and auxiliary magnet pieces used in the multiple stage arrangement shown in FIG. 4, including pole distance, spacing, and magnetic field intensity may be similar to those described above.

The main magnets 11, 12 and main magnets 15, 16, and auxiliary magnet rows 13, 14 and auxiliary magnet rows 17, 18 in different stages may be the same or different.

When plural pairs of N-S opposed main magnets each having a row of auxiliary magnet pieces as mentioned above are used, no particular limitation is imposed on the location of such plural pairs. A variation may be made on the embodiment shown in FIG. 4. Differently stated, an auxiliary magnet row may be placed on either the inlet or the outlet side of the main magnets in each stage. Preferably, a pair of auxiliary magnet rows are placed on the inlet side of the main magnets in the final stage.

Figure 5:
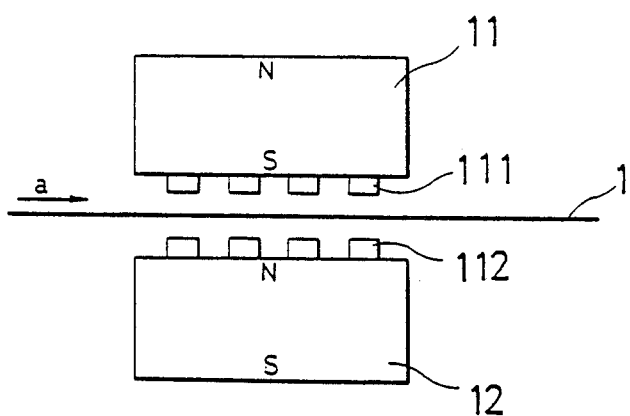

One preferred embodiment of arrangement B is illustrated in FIG. 5 wherein ferromagnetic pieces are placed at intervals on both the opposed surfaces of N-S opposed main magnets.

The magnets used are a pair of N-S opposed main magnets 11, 12. A series of ferromagnetic pieces 111, 112 are placed on the opposed surfaces of the main magnets 11, 12 at a suitable spacing, respectively.

Preferably 2 to about 100 ferromagnetic pieces 111, 112 are placed on each of the opposed surfaces of the main magnets 11, 12, at a spacing of about 0.5 to 20 mm, preferably about 1 to 10 mm. Each of the ferromagnetic pieces 111, 112 is about 0.5 to 20 mm long and about 1 to 10 mm high.

Ferromagnetic materials of which the ferromagnetic pieces are formed include iron, cobalt, nickel, Permalloy, Sendust, amorphous alloys, ferrite, and silicon steel.

The number of main magnets used is not limited to one pair. A plurality of main magnets may be used as long as at least one is provided with a series of spaced-apart ferromagnetic pieces. For example, the main magnets may be juxtaposed with or without a gap therebetween.

Each of the main magnets used preferably produces a magnetic field having an intensity of about 1000 to 6000 G.

The main magnets may be permanent magnets, electromagnets, or solenoids. The distance between the opposed poles may range from about 5 to about 30 mm and each main magnet may have a pole-to-pole distance of about 100 to about 5000 mm.

As in arrangement A, this arrangement produces a vibrating magnetic field, by virtue of which degree of perpendicular orientation and surface roughness are improved. The above-mentioned parameters of main magnets and ferromagnetic pieces including pole distance, spacing, and magnetic field intensity define the range in which the vibrating magnetic field performs well.

It should be noted that the ferromagnetic pieces 111, 112 are placed on the opposed surfaces of both the main magnets 11, 12 in FIG. 5 although ferromagnetic pieces may be placed on the opposed surface of only one main magnet. When plural pairs of N-S opposed main magnets having a series of ferromagnetic pieces on one opposed surface in each pair are used, no particular limitation is imposed on the location of plural magnets. For instance, the ferromagnetic pieces may be located on the side of the coated surface or back surface of a film or they may be alternately or cyclically located on the coated and back surface sides.

Arrangement C uses a pair of N-S opposed main magnets and a yoke is placed on the outlet and/or inlet side of at least one main magnet.

The yoke is configured such that the magnetic field produced thereby is varied in intensity at predetermined intervals as will be described later.

The preferred arrangement C is an arrangement wherein the yoke is placed at the inlet of the main magnet from the standpoint of improving degree of orientation and surface roughness. At least one set of N-S opposed main magnets and accompanying yoke(s) may be provided.

Figure 6:
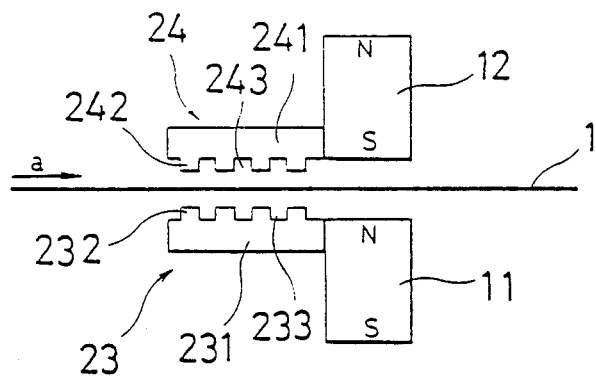

FIG. 6 shows one embodiment of arrangement C wherein a yoke is placed at the inlet of N-S opposed main magnets. More illustratively, a pair of main magnets 11, 12 are placed with their N and S poles opposed to define therebetween a path through which an as-coated film depicted by a solid straight line 1 is passed for magnetic orientation in a direction shown by arrow a. Yokes 23, 24 are placed at the inlet side of the main magnets 11, 12 with respect to the film transfer direction a.

In FIG. 6, each of the yokes 23, 24 include a plurality of base members 231, 241 which are provided on the side facing the path of a coated film with a plurality of bosses 232, 242 at suitable spacings 233, 243. The thus shaped base members are assembled into a yoke. The yokes 23, 24 are magnetically coupled to the main magnets 11, 12, respectively.

Preferably, 2 to about 50 bosses 232, 242 are provided in each of the base members. The spacings 233, 243 may range from about 0.5 to 10 mm, preferably from about 1 to 5 mm. Each of the bosses 232, 242 is about 0.5 to 10 mm long, preferably about 1 to 5 mm long and about 1 to 10 mm high. The base members 231, 241 may be about 3 to 30 mm thick.

The yoke may also comprise a base member integrally provided with bosses or a base member formed with recesses at suitable spacings.

The yokes may be formed from high magnetic permeability materials such as iron, nickel, Permalloy, Sendust, amorphous alloys, ferrite, and silicon steel.

The number of main magnets used is not limited to one pair. A plurality of main magnets may be used as long as at least one magnet is provided with a configured yoke. For example, the main magnets may be juxtaposed with or without a gap therebetween.

Each of the main magnets used preferably produces a magnetic field having an intensity of about 1000 to 6000 G.

The main magnets may be permanent magnets, electromagnets, or solenoids. The distance between the opposed poles may range from about 5 to about 30 mm and each main magnet may have a pole-to-pole distance of about 100 to about 5000 mm.

As in the preceding arrangements A and B, this arrangement produces a vibrating magnetic field, by virtue of which degree of perpendicular orientation and surface roughness are improved. The above-mentioned parameters of main magnets and yokes including boss length and spacing define the range in which the vibrating magnetic field performs well.

Figure 7:
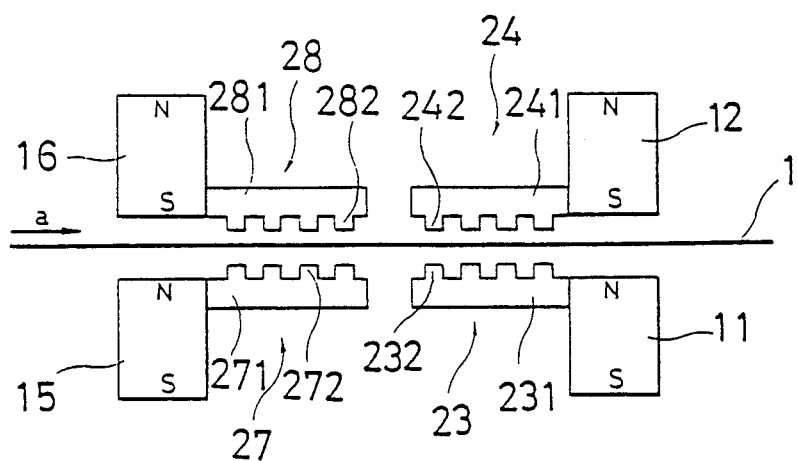

FIG. 7 illustrates another embodiment wherein two pairs of N-S opposed main magnets are each provided with a configured yoke. A magnetic recording medium in the form of a film 1 is transferred in the direction of arrow a and thus first passed between a first stage of N-S opposed main magnets 15, 16 which are followed on their outlet side by a pair of configured yokes 27, 28. The film 1 is then passed between a second stage of N-S opposed main magnets 11, 12 which are preceded on their inlet side by a pair of configured yokes 23, 24.

This embodiment produces the same effect as described above. The use of multiple stages of main magnets with yokes further improves surface precision and degree of orientation.

The parameters associated with the main magnets and yokes used in the multiple stage arrangement shown in FIG. 7, including boss length and spacing may be similar to those described above provided that they are within the range for producing an effective vibrating magnetic field. The main magnets 11, 12 and main magnets 15, 16, and yokes 23, 24 and yokes 27, 28 in different stages may be the same or different.

At least one of the main magnets may be provided with a yoke in the practice of the present invention. When plural pairs of N-S opposed main magnets having a yoke on only one main magnet of each pair are used, no particular limitation is imposed on the location of such plural pairs. For instance, the yokes may be located on the side of the coated surface or back surface of a film or they may be alternately or cyclically located on the coated and back surface sides.

A pair of main magnets both having yokes and another pair of yokes having only one yoke may be combined. The yoke(s) may be placed on either the inlet or the outlet side of the main magnets in each stage. Preferably, a yoke(s) is placed on the inlet side of the main magnets in the final stage.

During the magnetic orientation treatment, the magnetic paint coating should be dried within the domain of magnetic field to a sufficient extent to hold magnetic particles essentially unmovable. This drying eliminates the likelihood that the once oriented magnetic particles might be disordered to an undesirably low degree of orientation by any demagnetizing field outside the magnetic field.

The magnetic paint composition may be applied onto a substrate by any desired coating methods, for example, gravure coating, reverse roll coating, air knife coating, air doctor coating, blade coating, kiss coating, and spray coating.

The coated composition may preferably passed through the magnetic field at a rate of about 2 to 500 m/min.

Partially during and mainly after the magnetic orientation, the coating may preferably be dried at a temperature of about 30° to 150° C. with hot air or by means of a heater such as a far infrared lamp while moving at a rate of about 2 to 500 m/min.

The thus prepared magnetic recording medium of the present invention is intended for digital recording of the perpendicular recording mode. The digital recording is carried out by digitizing data into combinations of digits "0" and "1"] by the binary notation, for example. When 1 bit recording (that is, magnetic reversal) is carried out in a domain in a magnetic layer according to the perpendicular recording mode, positive (+) and negative (−) poles appear on the face and back surfaces of the magnetic layer sandwiching the domain, respectively. Only an attractive force acts between the poles, which indicates that the internal demagnetization field in the domain (in the thickness direction) is zero. Significant reversal of magnetization occurs in the magnetic layer and the distance required for transition can be theoretically reduced to the thickness of the domain wall the magnetic layer possesses. This is also true even when the recording density is increased. For this reason, the perpendicular recording mode is best suited for high density digital recording.

The digital recording modes, particularly modulation modes which can be used in the practice of the present invention include any well-known modes as used in various magnetic disk apparatus, flexible disk apparatus, magnetic card apparatus, computer tape apparatus, digital video apparatus and the like, for example, NRZI, FM, MFM, GCR, (2,7) code, (1,7) code, HDM-1, and FSK. A very high recording density is achievable with any of these modulation modes.

Depending on the shape of the medium, rotation speed, travel speed, data transfer speed, track number, track density and other parameters may be properly changed.

The magnetic head with which the magnetic recording medium of the present invention is operated may be any desired one of well-known heads including monopolar heads of the auxiliary pole excitation type, monopolar heads of the main pole excitation type, MR heads, and ring heads. In this respect, the coating type perpendicular magnetic recording media are more advantageous than thin-film type magnetic recording media because the ring heads which have proved their stability in actual operation can be used therewith.

Since the magnetic recording medium of the present invention has a magnetic layer containing plate magnetic material having an average particle diameter of up to 0.15 μm and a flakiness of at least 6, it exhibits an improved degree of perpendicular orientation and surface roughness. The present invention is thus successful in producing improved magnetic recording media characterized by high linear recording density, high resolution, good frequency response, and improved output stability. The excellent frequency response affords an additional advantage of facilitating the design of hardwares.

The magnetic recording media of the present invention are thus useful as digital recording floppy disks, digital audio disks, digital video disks, digital video floppies, digital image files, computer disks, magnetic disks, magnetic cards and the like.

EXAMPLES

In order that those skilled in the art will better understand the practice of the present invention, examples of the present invention will be described below. Several abbreviations are used, for example, Hc is coercive force in oersted, MW is molecular weight, PET is polyethylene terephthalate, MEK is methyl ethyl ketone, and MIBK is methyl isobutyl ketone.

EXAMPLE 1

A polyester (PET) film of 75 μm thick was coated on both the front and back surfaces with an undercoat layer having the following composition.

| Undercoat composition | Parts by weight |
| --- | --- |
| Carbon black (20 mμm) | 50 |
| (A) acryl-modified vinyl chloride-vinyl acetate-vinyl alcohol copolymer (MW = 45,000) | 50 |
| (B) acryl-modified polyurethane elastomer (MW = 5,000) | 50 |
| Stearic acid | 2 |
| Butyl stearate | 2 |
| Mixed solvent (1/1 MIBK/toluene) | 300 |

The mixture was milled for dispersion for 5 hours in a ball mill and applied onto the PET film so as to give a dry thickness of 0.7 μm. The coating was surface smoothened and exposed to electron radiation in a nitrogen atmosphere by means of an electron-curtain type electron accelerator (manufactured by ESI) operating under an accelerating voltage of 150 keV and an electrode current of 10 mA to an adsorption dose of 5 Mrad, thereby curing the coating to form an undercoat.

Various samples were prepared by forming magnetic layers on both the undercoats from a magnetic paint composition as formulated below.

At the outset, a magnetic paint base having the following composition was prepared using various hexagonal plate shaped barium ferrites (represented by $BaFe_{12}O_{19}$ having Ba and Fe partially replaced by Co and Ti and synthesized by a hydrothermal reaction process) having the average particle diameter and flakiness shown in Table 1.

| Ingredient | Parts by weight |
| --- | --- |
| Barium ferrite (Hc = 800 Oe) | 120 |
| α-$Al_2O_3$ (particulate, 0.5 μm) | 2 |
| Carbon black (20 mμm) | 10 |
| Solvent (50/50 MEK/toluene) | 100 |

These ingredients were milled for 3 hours in a ball mill to fully wet the barium ferrite. Separately, a binder composition was prepared by fully mixing the following ingredients into a solution.

| Ingredient | Parts by weight |
| --- | --- |
| Vinyl chloride-vinyl acetate-vinyl alcohol copolymer (containing maleic acid, MW = 40,000) | 6 (solids) |
| Acrylic double bond-incorporated vinyl chloride-vinyl acetate copolymer (containing maleic acid, MW = 20,000) | 12 (solids) |
| Acrylic double bond-incorporated polyether urethane elastomer (MW = 40,000) | 9 (solids) |
| Pentaerythritol triacrylate | 3 |
| Solvent (50/50 MEK/toluene) | 200 |
| Stearic acid | 4 |
| Butyl stearate | 2 |

The binder composition was added to the magnetic paint base in the ball mill and milled for dispersion for a further 42 hours. The thus obtained magnetic paint composition was applied onto the undercoats by gravure coating. The coated film was continuously moved between N-S opposed main magnets (permanent magnet 2000 G) to effect perpendicular orientation. After pasage through the magnetic field, the coated film was continuously dried with hot air or under a far infrared lamp to drive off the solvent, subjected to a surface smoothening, and then exposed to electron radiation in a nitrogen atmosphere by means of an electron-curtain type electron accelerator (manufactured by ESI) operating under an accelerating voltage of 150 keV and an electrode current of 20 mA to a total dose of 5 Mrad, thereby curing the coating. At the end of drying, the coating or magnetic layer had a thickness of 1.5 μm as measured by means of an electron micrometer. The coatings of magnetic paint composition were formed on both the major surfaces of the film to produce a double-sided magnetic film.

The thus prepared samples are designated Sample Nos. 101 through 137 (see Table 1). These samples were measured for various properties. Evaluation was made as follows.

Flakiness

The average particle diameter d is determined by taking an electron photomicrograph of particles of hexagonal plate barium ferrite under either a scanning electron microscope (SEM) or a transmission electron microscope (TEM), measuring the diameter of fifty (50) hexagonal particles in cross section, and averaging the measurements. The average thickness t is obtained by measuring the half-width at $2\theta$ from an X-ray diffraction pattern. The average flakiness R is then calculated by dividing the average particle diameter by the average thickness, that is, R=d/t.

Surface Roughness R20

The surface roughness R20 was determined from a chart obtained using a Talystep (manufactured by Taylor-Hobson Co.) in accordance with the twenty-point mean roughness determining process conforming to JIS B-0601. A probe meter having a probe with a tip size of 0.1×2.5 μm was operated under a load of 2 mg with a cut-off value of 0.17 mm.

Degree of Perpendicular Orientation

The rectangular ratio Br/Bm of a magnetic tape in a perpendicular direction was measured and corrected for a demagnetizing field.

Linear Recording Density $D_{50}$ (KFRPI)

The linear recording density $D_{50}$ (KFRPI) of a sample at which the sample reduces its output (E) produced in a low recording density region to one-half (E/2) in a high recording density region was determined at 300 revolutions per minute using a ferrite head with a gap of 0.3 μm.

Percent Modulation

Average amplitudes were measured at the maximum and minimum amplitudes along one turn of track. The modulation is given by the following formula provided that A and B represent the average amplitudes measured at the maximum and minimum amplitudes, respectively.

$$M = (A-B)/(A+B) \times 100\%$$

The modulation was determined on the innermost track 45 KFRPI. Measurements of ten (10) specimens are averaged. The results were evaluated in five grades as defined below.

5: up to 2%
5-4: 3-5%
4: 6-9%
3: 10-15%
2: 10-19%
1: 20% or higher

Grade 5 is the best and grade 4 is the minimum acceptable level for actual operation.

FIG. 1 graphically illustrates the output in μVp-p of sample No. 106 in Table 1 as a function of linear recording density in KFRPI. An arrowed broken line indicates how to determine $D_{50}$.

TABLE 1

| Sample No. | Particle diameter μm | Flakiness | R20 μm | Degree of perpendicular orientation | $D_{50}$ KFRPI | Modulation |
|---|---|---|---|---|---|---|
| 101* | 0.15 | 4 | 0.12 | 0.52 | 30 | 2 |
| 102* | 0.15 | 5 | 0.12 | 0.52 | 35 | 2 |
| 103 | 0.15 | 6 | 0.08 | 0.69 | 50 | 3 |
| 104 | 0.15 | 7 | 0.06 | 0.74 | 53 | 4-3 |
| 105 | 0.15 | 8 | 0.06 | 0.80 | 55 | 4-3 |
| 106 | 0.15 | 10 | 0.06 | 0.83 | 57 | 4 |
| 107 | 0.15 | 14 | 0.06 | 0.87 | 62 | 4 |
| 108 | 0.15 | 18 | 0.05 | 0.89 | 65 | 5-4 |
| 109 | 0.15 | 22 | 0.05 | 0.92 | 70 | 5-4 |
| 110 | 0.15 | 25 | 0.05 | 0.93 | 73 | 5-4 |
| 111 | 0.15 | 27 | 0.05 | 0.94 | 75 | 5-4 |
| 112 | 0.15 | 45 | 0.04 | 0.95 | 80 | 5 |
| 113* | 0.10 | 4 | 0.08 | 0.52 | 34 | 3 |
| 114* | 0.10 | 5 | 0.08 | 0.52 | 35 | 3 |
| 115 | 0.10 | 6 | 0.06 | 0.69 | 53 | 4 |
| 116 | 0.10 | 8 | 0.05 | 0.80 | 61 | 5-4 |
| 117 | 0.10 | 10 | 0.05 | 0.83 | 63 | 5-4 |
| 118 | 0.10 | 14 | 0.05 | 0.87 | 66 | 5-4 |
| 119 | 0.10 | 18 | 0.04 | 0.89 | 68 | 5 |
| 120 | 0.10 | 22 | 0.04 | 0.92 | 73 | 5 |
| 121 | 0.10 | 25 | 0.04 | 0.93 | 77 | 5 |
| 122 | 0.10 | 27 | 0.04 | 0.94 | 80 | 5 |
| 123 | 0.10 | 45 | 0.03 | 0.95 | 85 | 5 |
| 124* | 0.08 | 5 | 0.08 | 0.52 | 35 | 3 |
| 125 | 0.08 | 6 | 0.06 | 0.69 | 55 | 4 |
| 126 | 0.08 | 7 | 0.05 | 0.74 | 63 | 5-4 |
| 127 | 0.08 | 8 | 0.05 | 0.80 | 68 | 5-4 |
| 128 | 0.08 | 10 | 0.05 | 0.83 | 70 | 5-4 |
| 129 | 0.08 | 12 | 0.05 | 0.85 | 72 | 5-4 |
| 130 | 0.08 | 14 | 0.05 | 0.87 | 75 | 5-4 |
| 131 | 0.08 | 18 | 0.05 | 0.89 | 77 | 5-4 |
| 132 | 0.08 | 22 | 0.04 | 0.92 | 79 | 5 |
| 133 | 0.08 | 25 | 0.04 | 0.93 | 82 | 5 |
| 134 | 0.08 | 27 | 0.04 | 0.94 | 85 | 5 |
| 135 | 0.08 | 45 | 0.03 | 0.95 | 90 | 5 |
| 136* | 0.2 | 6 | 0.20 | 0.68 | ≦30 | 1 |
| 137 | 0.2 | 22 | 0.16 | 0.91 | 60 | 1 |

*comparison

As evident from the data in Table 1, the coating type perpendicular magnetic digital recording media of the present invention exhibit substantially improved surface roughness R20 and degree of perpendicular orientation. They have an increased linear recording density $D_{50}$, proving that they are especially useful high recording density media. Those magnetic media prepared from plate magnetic materials having an average particle diameter in excess of 0.15 μm or a flakiness of less than 6 are low in surface rougnness R20 and degree of perpendicular orientation. Most of them have a low linear recording density $D_{50}$ while those having a high $D_{50}$, for example, sample No. 137 show low grades of modulation and are thus unsatisfactory.

EXAMPLE 2

A magnetic paint base having the following composition was prepared using a hexagonal plate shaped barium ferrite represented by $BaFe_{12}O_{19}$ having Ba and Fe partially replaced by Co and Ti, synthesized by a vitrifying crystallization process, and having an average particle diameter of 0.08 μm, an average thickness of 0.008 μm, and Hc of 800 Oe.

| Ingredient | Parts by weight |
|---|---|
| Barium ferrite | 120 |
| α-$Al_2O_3$ (particulate, 0.5 μm) | 2 |
| Dispersant (crude lecithin isolated from soybean oil) | 3 |
| Solvent (70/30 MEK/cyclohexanone) | 100 |

These ingredients were milled to form a magnetic paint base in the same manner as in Example 1. Separately, a binder composition was prepared by fully mixing the following ingredients into a solution.

| Ingredient | Parts by weight |
|---|---|
| Vinyl chloride-vinyl acetate-vinyl alcohol copolymer (containing maleic acid, MW = 20,000) | 6 (solids) |
| Acryl-modified phenoxy (MW = 35,000) | 6 (solids) |
| Acryl-modified polyether urethane elastomer (MW = 20,000) | 18 (solids) |
| Solvent (70/30 MEK/cyclohexanone) | 200 |
| Higher fatty acid-modified silicone oil | 3 |
| Butyl myristate | 3 |

The binder composition was added to the magnetic paint base to form a magnetic paint composition which was applied onto the undercoated PET film by following the same procedure as in Example 1 except that the orientation was effected in an A.C. magnetic field having an intensity of 2000 G.

There was obtained Sample A which was examined for various properties. The results are shown below.

R20: 0.05 μm

Degree of perpendicular orientation: 0.83

Sample B was prepared by the same procedure as described for Sample A except that the radiation-curable binder was replaced by a thermosetting binder. More specifically, the total amount of 30 parts by weight of the vinyl chloride-vinyl acetate-vinyl alcohol copolymer (containing maleic acid) plus acryl-modified phenoxy plus acryl-modified polyether urethane elastomer was replaced by 15 parts by weight of a vinyl chloride-vinyl acetate-vinyl alcohol copolymer (VAGH manufactured by Union Carbide) and 15 parts by weight of a urethane (Nippolane 3022 manufactured by Nippon Polyurethane K. K.). At the end of dispersion, 5 parts by weight (solids) of isocyanate compound (Colonate L manufactured by Nippon Polyurethane K. K.) was added to the magnetic paint composition. After surface smoothening, the coating was held at 80° C. for 48 hours for thermosetting.

Samples A and B were produced in the form of a jumbo roll by winding a web of 5000 m long on a take-up roll of 8 inches in diameter. Test specimens were cut out from inside and outside turns and determined for resolution in percent.

The resolution was determined by the following procedure.

Resolution

In the above-mentioned measurement of linear recording density D50, the resolution of 48 KFRPI/12 KFRPI was calculated. The measured resolution of sample A was assumed to be 100% and measurements of other samples are calculated in percent on this basis.

The results are shown below.

|  | Resolution, % | |
|---|---|---|
|  | Outside | Inside |
| Sample A (invention) | 100 | 100 |
| Sample B (comparison) | 96 | 86 |

As seen from these data, the tape (Sample B) using a thermosetting resin binder composition exhibits a reduction in resolution due to tightening of a jumbo roll during the thermosetting process as compared with the tape using a radiation-curable resin binder composition. The use of a radiation-curable resin binder composition is desirable for actual applications.

EXAMPLE 3

Samples were prepared by substantially the same procedure as in Example 1. Plate magnetic materials having an average particle diameter and a flakiness as shown in Table 2 were combined with the same binder as in Example 1. The magnetic layer was formed on the undercoat layer to a different thickness as shown in Table 2.

The samples were measured for R20, degree of perpendicular orientation, $D_{50}$, and modulation. In the measurement of linear recording density $D_{50}$ (KFRPI) of sample Nos. 201–210, a ferrite head with a gap of 0.25 $\mu$m was used.

The results are shown in Table 2.

TABLE 2

| Sample No. | Layer thick $\mu$m | Particle diameter $\mu$m | Flakiness | R20 $\mu$m | Degree of perpendicular orientation | $D_{50}$ KFRPI | Modulation |
|---|---|---|---|---|---|---|---|
| 201 | 0.5 | 0.15 | 12.5 | 0.05 | 0.90 | 82 | 4 |
| 202 | 0.8 | 0.15 | 12.5 | 0.05 | 0.89 | 80 | 4 |
| 203 | 1.0 | 0.15 | 12.5 | 0.05 | 0.88 | 77 | 4 |
| 204 | 1.2 | 0.15 | 12.5 | 0.05 | 0.86 | 76 | 4 |
| 205 | 1.5 | 0.15 | 12.5 | 0.05 | 0.83 | 73 | 4 |
| 206 | 1.8 | 0.15 | 12.5 | 0.05 | 0.72 | 65 | 4 |
| 207 | 2.0 | 0.15 | 12.5 | 0.05 | 0.70 | 58 | 4 |
| 208 | 3.0 | 0.15 | 12.5 | 0.05 | 0.66 | 55 | 4 |
| 209 | 5.0 | 0.15 | 12.5 | 0.08 | 0.65 | 45 | 3 |
| 210 | 10.0 | 0.15 | 12.5 | 0.15 | 0.60 | 40 | 1 |
| 211 | 0.5 | 0.15 | 10 | 0.06 | 0.94 | 70 | 4 |
| 212 | 0.8 | 0.15 | 10 | 0.06 | 0.93 | 68 | 4 |
| 213 | 1.0 | 0.15 | 10 | 0.06 | 0.92 | 65 | 4 |
| 214 | 1.2 | 0.15 | 10 | 0.06 | 0.90 | 62 | 4 |
| 215 | 1.5 | 0.15 | 10 | 0.06 | 0.86 | 57 | 4 |
| 216 | 1.8 | 0.15 | 10 | 0.06 | 0.79 | 54 | 4 |
| 217 | 2.0 | 0.15 | 10 | 0.07 | 0.75 | 53 | 4 |
| 218 | 3.0 | 0.15 | 10 | 0.07 | 0.72 | 52 | 4 |
| 219 | 5.0 | 0.15 | 10 | 0.08 | 0.65 | 50 | 3 |
| 220 | 0.5 | 0.15 | 25 | 0.05 | 0.96 | 80 | 5–4 |
| 221 | 0.8 | 0.15 | 25 | 0.05 | 0.95 | 79 | 5–4 |
| 222 | 1.0 | 0.15 | 25 | 0.05 | 0.94 | 77 | 5–4 |
| 223 | 1.2 | 0.15 | 25 | 0.05 | 0.93 | 75 | 5–4 |
| 224 | 1.5 | 0.15 | 25 | 0.05 | 0.92 | 73 | 5–4 |
| 225 | 1.8 | 0.15 | 25 | 0.06 | 0.83 | 72 | 4 |
| 226 | 2.0 | 0.15 | 25 | 0.07 | 0.80 | 71 | 4 |
| 227 | 3.0 | 0.15 | 25 | 0.07 | 0.76 | 70 | 4 |
| 228 | 5.0 | 0.15 | 25 | 0.08 | 0.69 | 70 | 3 |
| 229 | 0.5 | 0.07 | 10 | 0.04 | 0.90 | 84 | 5 |
| 230 | 0.8 | 0.07 | 10 | 0.04 | 0.89 | 81 | 5 |
| 231 | 1.0 | 0.07 | 10 | 0.04 | 0.88 | 79 | 5 |
| 232 | 1.2 | 0.07 | 10 | 0.04 | 0.86 | 78 | 5 |
| 233 | 1.5 | 0.07 | 10 | 0.04 | 0.83 | 72 | 5 |
| 234 | 1.8 | 0.07 | 10 | 0.05 | 0.72 | 65 | 5–4 |
| 235 | 2.0 | 0.07 | 10 | 0.05 | 0.68 | 58 | 5–4 |
| 236 | 3.0 | 0.07 | 10 | 0.05 | 0.62 | 55 | 5–4 |

As evident from the data in Table 2, controlling the thickness of magnetic layer to a specific range increases the surface roughness R20 and degree of perpendicular orientation, particularly the latter, and thus results in improved linear recording density $D_{50}$. The magnetic layer thickness should be 5 $\mu$m or less for satisfactory actual performance. Better results were obtained when the magnetic layer has a thickness of about 0.1 to 3.5 $\mu$m, and more preferably about 0.5 to 1.5 $\mu$m.

EXAMPLE 4

The magnetic orientation during the tape manufacturing process in Example 1 was changed as follows.

Instead of a pair of N-S opposed magnets used in Example 1, this example used a pair of N-S opposed main magnets 11, 12 provided on their inlet side with a pair of rows 13, 14 of auxiliary magnets having the same polarity in each row as shown in FIG. 3. Each main magnet produced a magnetic field having an intensity of 3000 G and each auxiliary magnet produced a magnetic field having an intensity of 1800 G. Each main magnet was an assembly of fifteen magnet pieces having a pole distance of 50 mm and closely juxtaposed without a gap. Each auxiliary magnet row was an assembly of twenty (20) magnet pieces having a pole distance of 3 mm and spaced apart by non-magnetic spacers of brass.

Under the aforementioned orienting magnetic field conditions, a sample was prepared by the same procedure as used for sample No. 105 in Example 1 (see Table 1, average particle diameter 0.15 μm and flakiness 8). This sample is designated sample No. 401.

Sample No. 401 was measured for degree of perpendicular orientation and R20 to find improvements in both the properties as compared with the data of sample No. 105.

| Sample No. | Degree of perpendicular orientation | R20, μm |
|---|---|---|
| 105 | 0.80 | 0.05 |
| 401 | 0.84 | 0.04 |

We claim:
1. A coating type perpendicular magnetic recording medium intended for digital recording comprising a substrate having opposed major surfaces and at least one magnetic layer formed on the major surface, said magnetic layer comprising a radiation-cured binder and a plate magnetic material having an average particle diameter of up to 0.15 μm and a flakiness of at least 6.
2. A magnetic recording medium according to claim 1 wherein the magnetic layer has a thickness of about 0.3 to about 5.0 μm.
3. A magnetic recording medium according to claim 1 wherein the magnetic layer has a surface roughness R20 of up to 0.08 μm.
4. A magnetic recording medium according to claim 1 wherein the plate magnetic material is selected from barium ferrite and strontium ferrite.

* * * * *